US008782285B1

(12) United States Patent
Cassidy et al.

(10) Patent No.: US 8,782,285 B1
(45) Date of Patent: Jul. 15, 2014

(54) LAZY TRANSCODING AND RE-TRANSCODING OF MEDIA OBJECTS IN AN ONLINE VIDEO PLATFORM

(71) Applicant: Limelight Networks, Inc., Tempe, AZ (US)

(72) Inventors: Sean Cassidy, Seattle, WA (US); Brandon Smith, Seattle, WA (US); Nicholas Beaudrot, Seattle, WA (US); Spencer Proffit, Vashon, WA (US)

(73) Assignee: Limelight Networks, Inc., Tempe, AZ (US)

( * ) Notice: Subject to any disclaimer, the term of this patent is extended or adjusted under 35 U.S.C. 154(b) by 0 days.

(21) Appl. No.: 14/144,473

(22) Filed: Dec. 30, 2013

Related U.S. Application Data

(60) Provisional application No. 61/912,982, filed on Dec. 6, 2013.

(51) Int. Cl.
*G06F 15/16* (2006.01)
(52) U.S. Cl.
USPC .......................................................... 709/246
(58) Field of Classification Search
CPC ................ H04N 19/00472; H04N 21/234098; H04N 7/26941; H04N 21/440218; H04N 21/47202; H04N 54/4084; H04N 29/08792; H04N 67/2823; G11B 27/034; G11B 27/02; G11B 220/41; G11B 27/28
USPC ................................ 709/246–247; 725/86, 92
See application file for complete search history.

(56) References Cited

U.S. PATENT DOCUMENTS

| 7,751,628 | B1 | 7/2010 | Reisman |
| 8,145,779 | B2 | 3/2012 | Zhang |
| 8,219,711 | B2 | 7/2012 | Visharam et al. |
| 8,527,645 | B1 | 9/2013 | Proffit et al. |
| 8,610,603 | B2 * | 12/2013 | Lai et al. .......................... 341/51 |
| 2012/0144302 | A1 | 6/2012 | Campanotti et al. |
| 2013/0297746 | A1 * | 11/2013 | Holden et al. ................. 709/219 |
| 2014/0025837 | A1 * | 1/2014 | Swenson et al. .............. 709/231 |

FOREIGN PATENT DOCUMENTS

| WO | 2010071516 A1 | 6/2010 |
| WO | 2010091089 A1 | 8/2010 |
| WO | 2012083298 A2 | 6/2012 |
| WO | 2012105967 A1 | 8/2012 |

* cited by examiner

*Primary Examiner* — Chirag R Patel
(74) *Attorney, Agent, or Firm* — Kilpatrick Townsend & Stockton LLP

(57) ABSTRACT

A method of managing resources dedicated to a content object in a content delivery network includes transcoding and storing the content object in one or more of a plurality of delivery formats, and associating a transcoding profile with the content object, the transcoding profile including records of the content object with respect to delivery of the content object to end users across the plurality of delivery formats. The method also includes periodically executing a process that determines, utilizing the transcoding profile, an elapsed time since a most recent delivery of the content object in a particular delivery format to one of the end users, and deletes a copy of the content object in the particular delivery format when the elapsed time exceeds a threshold.

17 Claims, 4 Drawing Sheets

Initial upload of RudeAwakening.mov on
27 April 2013, transcoding to .mp4MD,
.mpdVS formats 150-2

| RudeAwakening | .mov | | Dormant |
|---|---|---|---|
| .mov | /POP1/mov | 20130427.0027 | PHX |
| .mp4HD | | | |
| .mp4MD | /POP1/mp4MD | 20130427.0035 | PHX |
| .mp4VGA | | | |
| .mp3SV | /POP1/mp3SV | 20130427.0042 | PHX |

End user request on 1 Jun 2013 for
RudeAwakening in .mp4HD format 150-3

| RudeAwakening | .mov | | Active |
|---|---|---|---|
| .mov | /POP1/mov | 20130427.0027 | PHX |
| .mp4HD | /POP1/mp4HD | 20130601.2130 | PHX |
| .mp4MD | /POP1/mp4MD | 20130427.0035 | PHX |
| .mp4VGA | /POP1/mp4VGA | 20130601.2144 | PHX |
| .mp3SV | /POP1/mp3SV | 20130427.0042 | PHX |

Sweeper program on 15 Aug 2013
eliminates copies that are not original
or accessed in last 4 months 150-4

| RudeAwakening | .mov | | Active |
|---|---|---|---|
| .mov | /POP1/mov | 20130427.0027 | PHX |
| .mp4HD | /POP1/mp4HD | 20130601.2130 | PHX |
| .mp4MD | | | |
| .mp4VGA | /POP1/mp4VGA | 20130601.2144 | PHX |
| .mp3SV | | | |

Sweeper program on 15 Oct 2013
eliminates copies that are not original
or accessed in last 4 months 150-5

| RudeAwakening | .mov | | Dormant |
|---|---|---|---|
| .mov | /POP1/mov | 20130427.0027 | PHX |
| .mp4HD | | | |
| .mp4MD | | | |
| .mp4VGA | | | |
| .mp3SV | | | |

*FIG. 3*

LAZY TRANSCODING AND RE-TRANSCODING OF MEDIA OBJECTS IN AN ONLINE VIDEO PLATFORM

CROSS REFERENCE TO RELATED APPLICATIONS

This application is a non-provisional application of, and claims priority to, U.S. Provisional Patent Application No. 61/912,982, filed on 6 Dec. 2013 and entitled "Lazy Transcoding and Re-transcoding of Media Objects in an Online Video Platform; the above-identified application is incorporated by reference herein, in its entirety, for all purposes.

BACKGROUND

Video and audio content that is provided over networks (e.g., the Internet) to a variety of end user systems typically must be transcoded into a variety of formats for compatibility with the end user systems. For example, mobile devices often require different video formats than laptop or desktop computers, and different video formats than each other. The need for transcoding introduces a variety of challenges for institutions such as content delivery networks, that store and provide large quantities of content, especially when such content is in high demand. However, indefinite storage of large quantities of transcoded content in multiple formats can consume a high amount of network storage resources.

SUMMARY

In an embodiment, a method of managing resources dedicated to a content object in a content delivery network includes transcoding and storing the content object in one or more of a plurality of delivery formats, and associating a transcoding profile with the content object, the transcoding profile including records of the content object with respect to delivery of the content object to end users across the plurality of delivery formats. The method also includes periodically executing a process that determines, utilizing the transcoding profile, an elapsed time since a most recent delivery of the content object in a particular delivery format to one of the end users, and deletes a copy of the content object in the particular delivery format when the elapsed time exceeds a threshold.

Further areas of applicability of the present disclosure will become apparent from the detailed description provided hereinafter. It should be understood that the detailed description and specific examples below, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures:

FIG. 3 schematically illustrates contents of an exemplary transcoding profile 150 from its initial generation through several content delivery and management operations, in accord with an embodiment.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides exemplary embodiments only, and is not intended to limit the scope, applicability or configuration of the disclosure. Rather, the description will provide those skilled in the art with an enabling description for implementing embodiments. It is understood that various changes may be made in the function and arrangement of elements without departing from the spirit and scope as set forth in the appended claims.

A content delivery network (CDN) often accepts content objects (e.g., audio or video files) from content providers, who are typically the paying customers of the CDN. The content object must typically be transcoded from the format in which it is initially received by the CDN, to a format compatible with end users' systems. The CDN typically performs the transcoding and may store multiple transcoded versions of the content object in a variety of formats. In embodiments herein, storage costs associated with transcoded content objects are reduced by delaying some of the transcoding work until a content object is actually needed in a specific format. In other embodiments, storage costs are further reduced by reviewing end user demand for content objects, and deleting objects that have not been accessed for a period of time.

Figure 1:
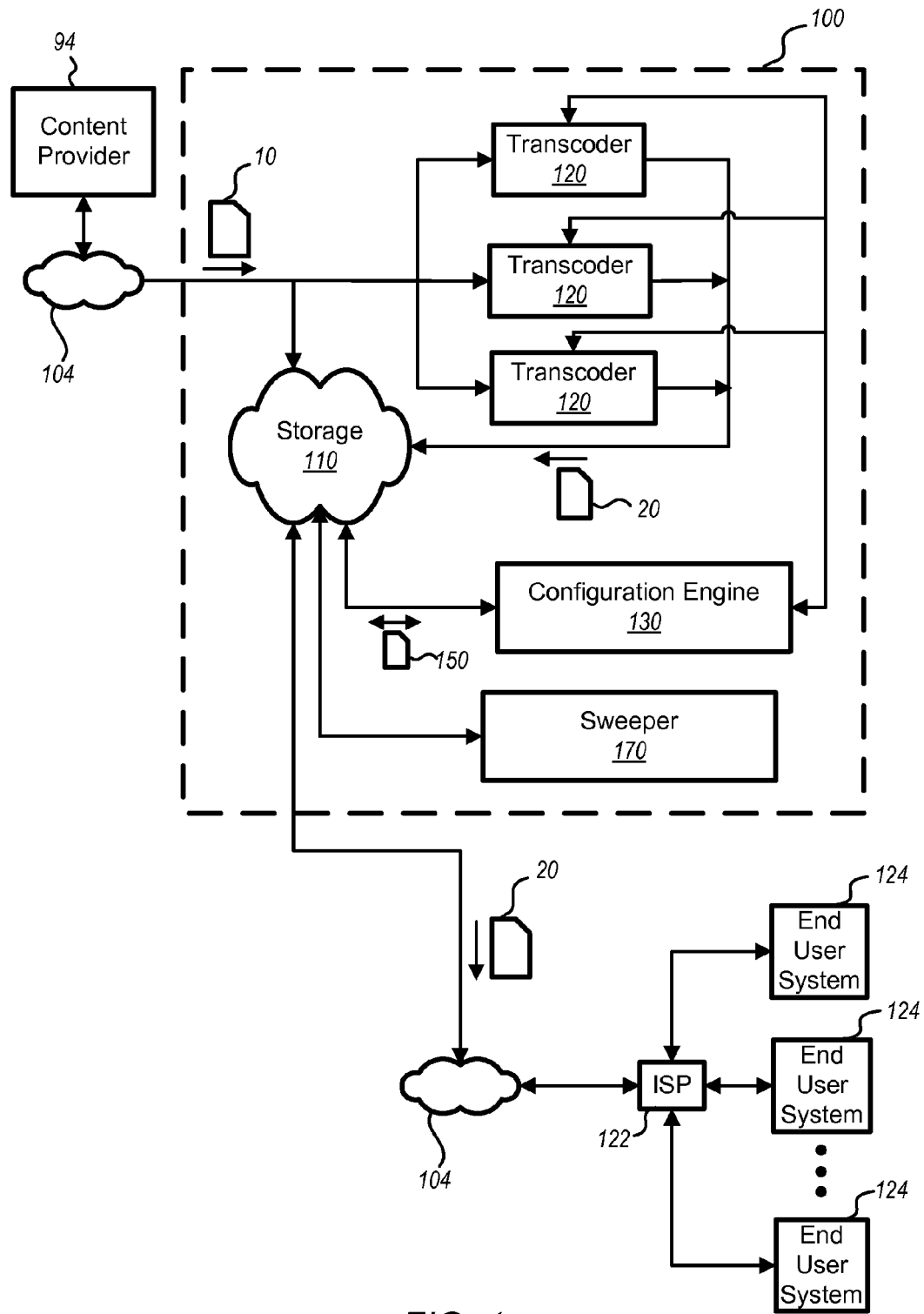
FIG. 1 schematically illustrates management of content from a content provider within a content delivery network (CDN), in accord with an embodiment.

FIG. 1 schematically illustrates management of content from a content provider 94 within a CDN 100. Only certain functional components are shown in FIG. 1, for clarity of illustration. In the example of FIG. 1, content provider 94 sends a content object 10 (e.g., a video) by way of Internet 104 to CDN 100, where it may be stored in storage 110. Storage 110 stores, without limitation, any or all of the original content object 10, transcoded copies 20, transcoding profiles 150, rules for management of transcoded copies, and software for execution by any components of CDN 100. Either from storage 110, or directly from content provider 94, copies of content object 10 are processed by computers that can translate a content object from one video format to another (known as "transcoders" herein) 120-1, 120-2, . . . 120-n (i.e., any number of transcoders 120). Transcoders 120 produce transcoded copies 20 that are stored in storage 110. Storage 110 may be a single physical storage device for both incoming content object 10 and transcoded copies 20, or may be different physical storage devices; similarly, transcoders 120 may be dedicated devices or functionality provided within one or more servers. In particular, any or all of the features shown within CDN 100 may be included in one or more points of presence (POPs) of the CDN that are geographically distributed to reduce latency of service to end user systems 124.

To minimize storage costs associated with transcoded copies 20, some of all of the following strategies are implemented: a minimal subset of transcodes are performed upon initial receipt of a content object 10; certain transcodes are performed only when an end user requests a content object that is not already transcoded; transcoded copies 20 that are unlikely to be accessed are identified and deleted to free up storage space; and any deleted transcoded copies that are subsequently requested are replaced by generating a new transcoded copy 20 from the original content object 10 (or a compatible transcoded copy 20 thereof). The originally received content object 10 is typically not deleted, although in embodiments it may be.

In the example of FIG. 1, CDN 100 notifies a configuration engine 130 when a content object 10 is received from content provider 94. The notification may occur through communication between transcoders 120 and configuration engine 130, as shown. Configuration engine 130 assigns a transcoding profile 150 to each received content object 10, and stores transcoding profile 150 in storage 110. Transcoding profile 150 is generated and updated to provide information about what transcoded copies 20 exist, optionally where they are stored and when they are accessed, and other (further optional) information. A sweeper function 170 periodically reviews transcoding profiles 150 and indicates deletion of certain transcoded copies 20 to free up space in storage 110, according to rules and/or criteria that identify transcoded copies 20 that are unlikely to be utilized (and/or can be regenerated). The rules and/or criteria utilized to identify transcoded copies 20 for deletion can be customized, as discussed below.

Figure 2:
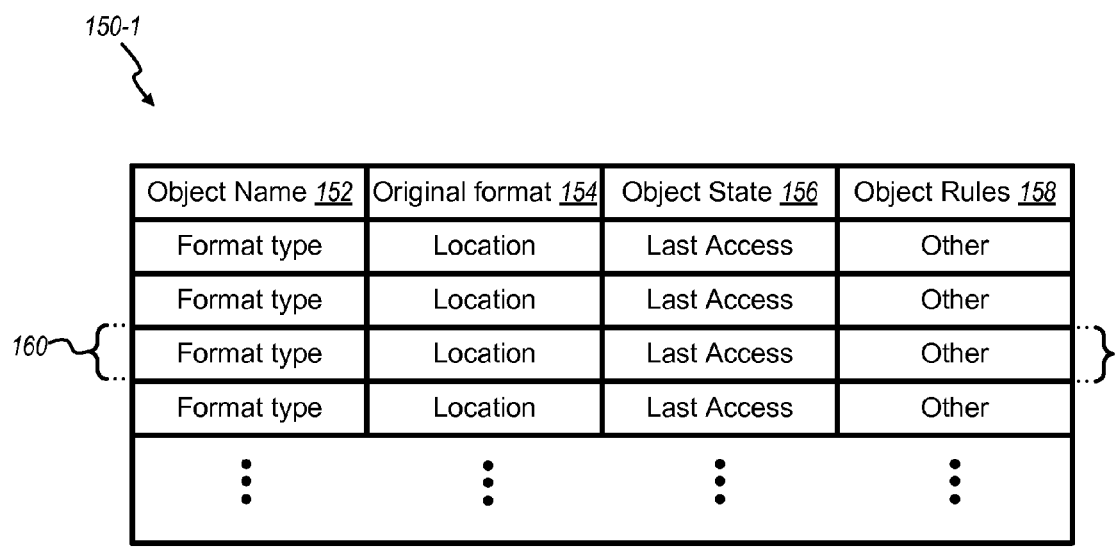
FIG. 2 schematically illustrates an exemplary transcoding profile, in accord with an embodiment.

FIG. 2 schematically illustrates an exemplary transcoding profile 150-1. It is to be understood that other embodiments of transcoding profiles 150 may have more or fewer fields than are shown in FIG. 2, and may organize the fields differently than shown in FIG. 2. Exemplary transcoding profile 150-1 includes fields 152, 154, 156, 158 and one or more records 160. Object name field 152 holds a name of a content object 10. An optional, original format field 154 holds a designation of an original format of a content object 10 (e.g., the format in which the content object was received from content provider 94). In embodiments, original format field 154 may not be utilized; for example a CDN may utilize a particular storage location to store originally received content object 10 irrespective of the format in which it was received. Object state field 156 holds a currently assigned state of the content object; the state may be assigned according to any type of rules, and is typically utilized for quick reference by maintenance programs (such as, for example, sweeper function 170) to determine whether transcoding profile 150-1 should be analyzed for possible action, or immediately passed over. For example, a state of "Active" may indicate need for periodic review to determine whether a transcoded copy 20 is still being accessed, or if at least some copies of content object 10 should be deleted; a state of "Dormant" may indicate no need for review. Other object states having more detailed meanings are also possible (e.g., states that indicate "Never accessed," "Original copy only" and the like). An optional, object rules field 158 holds rules and/or criteria for managing transcoded copies of the content object 10. The object rules may include listings of rules (e.g., "sweep every X days," "never delete .mp4 format," and the like), executable code for implementing such rules, and/or a pointer or link to such rules or executable code.

Object rules field 158 may not always be present in a transcoding profile 150, for example in a case where a CDN applies identical rules and/or criteria to all content objects. Furthermore, a transcoding field could include additional fields that help identify properties associated with a content object 10 and/or specifics pertinent to managing transcoded copies 20 of the content object. Rules and/or criteria for creating, reviewing, preserving and/or deleting transcoded copies 20 can be set in any manner by a CDN 100, by a content provider 94 that provides a given content object 10, or by agreement between CDN 100 and content provider 94. For example, rules for creating transcoded copies 20 of a content object 10 may be based on demand for the content object in a different transcoded format, or on estimated demand based on the calendar or on current events (e.g., demand for Christmas themed videos may be estimated to increase in November and December; demand for a movie may increase if it wins an Oscar months after its initial release, or when its sequel is released). Rules for creating transcoded copies 20 of a content object 10 may also be adjusted based on geographic location and/or current demand on network resources. For example, a POP or group of POPs concentrated in a particular region, that includes transcoders 120, may experience heavy demand for content associated with one or more output formats (e.g., various formats that would be associated with iOS based devices). In such a case, the given POP or group of POPs may choose to prioritize transcoding into the one or more output formats. Conversely, if another POP or group of POPs concentrated in another region are not experiencing any demand for files in certain formats, transcoders in those POPs may be tasked with other jobs. Priority decisions can also be made based on arrangements between CDN 100 and content provider 94, e.g., resources can be dedicated and/or preferentially applied by CDN 100 if an agreement between CDN 100 and content provider 94 mandates it. Such arrangements may be reflected in the cost of transcoding, that is, CDN 100 may realize higher payment from content provider 94 in exchange for providing such resources. This amounts to content provider 94 paying CDN 100 more to provide a better end user experience for content provider 94's content.

Similarly, rules and/or criteria for deleting transcoded copies 20 may be based on last demand for a given transcoded copy 20, cumulative demand for all transcoded copies 20 over a time period, percentage of all demand for a content object 10 in a given transcoded format within a time period, arrangements with content providers, and the like, as well as calendar or current events (e.g., demand for Christmas videos goes down in January).

Transcoding profile 150-1 also includes records 160 that are associated with specific transcoded copies 20 of content object 10. The example of FIG. 2 shows records 160 as including format type, location, last access time, and/or other information; these information types are exemplary only and may vary in embodiments. Fields corresponding to an exemplary record 160 are shown between brackets in FIG. 2. Certain blank (e.g., all zeroes) fields of transcoding profile 150-1 may carry meaning; for example a record 160 that indicates a transcoding format but has a blank location field for that format may signify that no transcoded copy 20 exists for that format.

Variations in transcoding profiles 150 are contemplated herein. For example, a number of records 160 in a transcoding profile 150 may be fixed, or may vary depending on the types of transcoded copies 20 that exist. In another example, a field of each record 160 may be utilized to designate a geographic or network location of a transcoded copy 20, to provide corresponding geographic or network management granularity of transcoded copies. In still another example, a transcoding profile 150 may not include original format field 154 (e.g., when other methods exist for storing and/or tracking the as-received format of content object 10) and/or may not include object rules field 158 (e.g., identical management rules may be implemented for all content objects, or other methods may exist for identifying or implementing such rules). In yet another example, records 160 can include multiple access time records (e.g., a date/time entry for each time that a transcoded copy 20 is accessed) to enable analysis of demand for a transcoded copy 20 over time.

FIG. 3 schematically illustrates contents of an exemplary transcoding profile 150 from its initial generation through several content delivery and management operations. In a CDN illustrated by the example of FIG. 3, the CDN receives content objects, transcodes them, serves them to end users, and runs a sweeper program on the 15$^{th}$ of each month to eliminate transcoded copies that are unlikely to be requested. In this case the rules governing management of a content object do not vary by the content object, so transcoding profiles 150-2 through 150-5 shown in FIG. 3 do not include an object rules field 158 as described above. Additionally, the record structure of transcoding profiles 150-2 through 150-5, the video formats and the actions taken are exemplary only and will vary among embodiments.

Initially, a content object called "RudeAwakening.mov" is received by a content delivery network (e.g., CDN 100) on 27 April. In the example of FIG. 3, the incoming file is automatically transcoded into .mp4MD (medium definition) and .mp3SV (.mp3 audio file with still video image) formats. Transcoding profile 150-2 is generated with a record of "RudeAwakening" in .mov format and showing its upload time, and records of "RudeAwakening" in the transcoded .mp4MD and .mp3SV formats. The records show that these copies are in a point of presence (POP) designated as PHX, and include path information for locating the copies. Transcoding profile 150-2 also includes an indication that the originally received copy was in the .mov format, and a "Dormant" status indicator showing that no copies of "RudeAwakening" have been requested in the last four months.

A couple months later, "RudeAwakening" is requested by an end user in an .mp4HD (high definition) format. By referring to transcoding profile 150-2, CDN 100 knows that the requested content is not available in that format, and accordingly transcodes a copy into that format and sends it to the end user. Since the user's request is an indication of at least some demand, CDN 100 also transcodes a copy into an .mp4VGA (low definition) format. Records are added to the transcoding record to show that the .mp4HD and .mp4VGA formats exist, status of the content object is changed to "Active" and the record is stored as transcoding profile 150-3.

The sweeper program that runs on the 15$^{th}$ of each month only looks at Active transcoding profiles, and deletes those transcoded profiles that are not original and were last accessed over four months ago. Therefore transcoding profile 150-2 is not reviewed on May 15. After its status changes to "Active," transcoding profile 150-3 is reviewed on June 15 and July 15, but it does not trigger any activity because it does not show any files that have gone over four months without activity. However on 15 August, the sweeper program finds the original .mov, the .mp4MD and .mp3SV copies have not been accessed for over four months. The .mov file is not deleted because it is indicated as the original copy, but .mp4MD and .mp3SV copies are deleted. Status remains Active because the last access of some version of "RudeAwakening" is still less than four months ago. The transcoding record is updated and stored as transcoding profile 150-4.

When the sweeper program runs on 15 October and again reviews Active transcoding profiles, it finds transcoding profile 150-4 indicating that the .mp4HD and .mp4VGA copies of "RudeAwakening" have not been accessed for over four months, so they are deleted accordingly. The original .mov copy is not deleted. Status is changed to Dormant because the last access of some version of "RudeAwakening" is now over four months ago. The transcoding profile is updated and stored as transcoding profile 150-5. Further reviews of transcoding profile 150-5 skip over "RudeAwakening" because its status is Dormant; other programs may be utilized to identify dormant content that can be deleted (e.g., including the original copy, if permitted by agreements between the CDN and the content provider).

Figure 4:
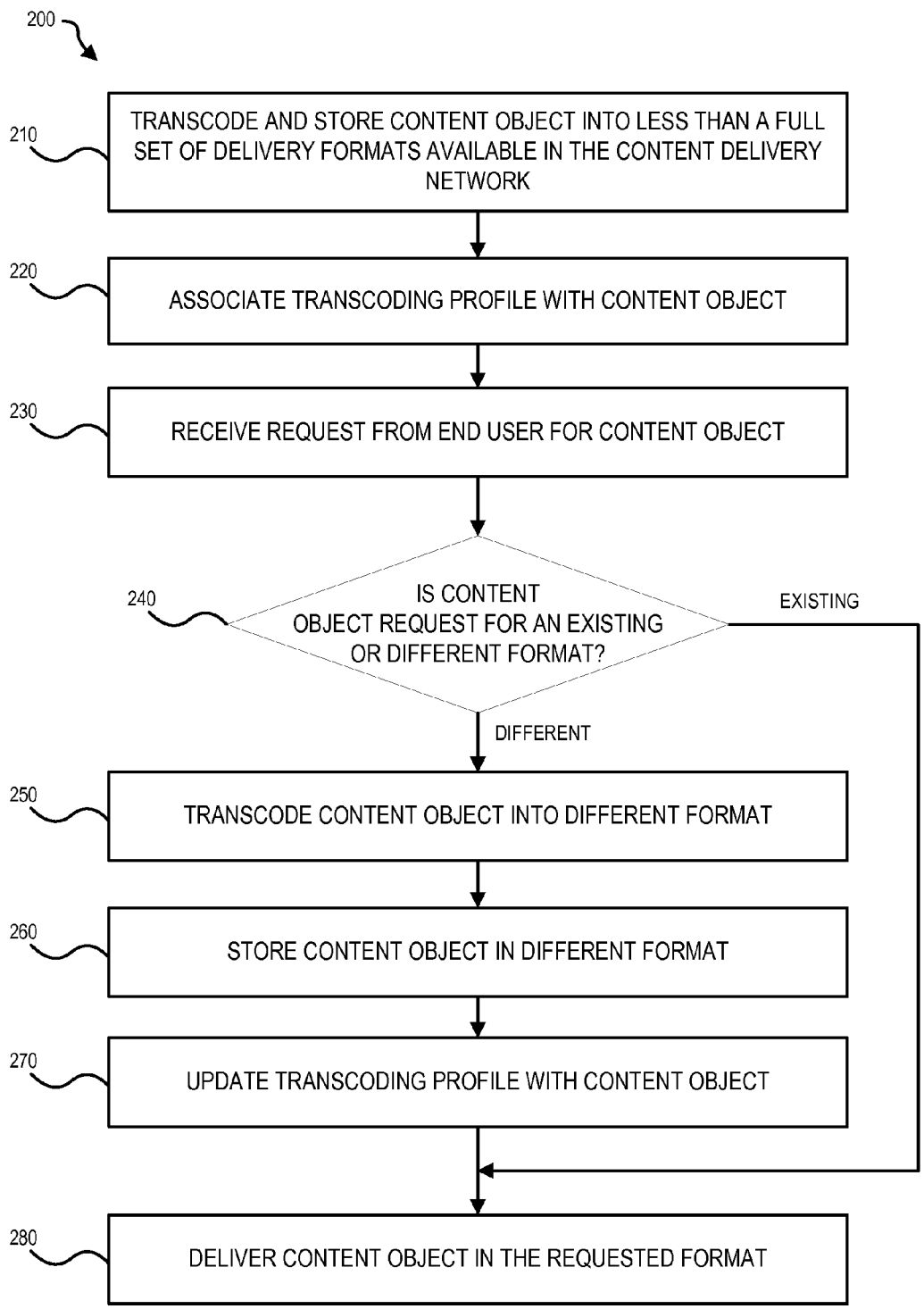
FIG. 4 schematically illustrates processing of content from a content provider through a content delivery network to end users.

FIG. 4 is a flowchart that schematically illustrates a method 200 of managing resources dedicated to a content object in a content delivery network. Method 200 is for example implemented by CDN 100, FIG. 1. Method 200 begins with a step 210 that transcodes and stores the content object in one or more delivery formats that are less than a full set of delivery formats that the content delivery network can transcode into. An example of step 210 is one of transcoders 120, FIG. 1, transcoding content object 10 and storage 110 storing the result as transcoded copy 20. A step 220 associates a transcoding profile with the content object. An example of step 220 is configuration engine 130, FIG. 1, associating a transcoding profile 150 with the content object. The transcoding profile includes records of the content object with respect to delivery of the content object to end users for any of the full set of the delivery formats. In step 230, the CDN receives a request from an end user for the content object. An example of step 230 is CDN 100 receiving a request for a content object from an end user 124. In a decision step 240, the CDN determines whether the content object request is for one of the existing delivery formats, that is, one of the formats into which the content object was stored in step 210. Step 240 may for example utilize a transcoding profile 150 to determine whether the content object exists in the requested delivery format. If the request is for the content object in an existing delivery format, method 200 proceeds to step 280 which delivers the content object in the requested format (in this case, the existing format). If the request is for a different format than already exists, method 200 proceeds to step 250, which transcodes the content object into the different, requested format. An example of step 250 is one of transcoders 120, FIG. 1, transcoding content object 10 into the requested, different format. A step 260 then stores the content object in the different format. An example of step 260 is storage 110 storing the result as transcoded copy 20. A step 270 updates the transcoding profile of the content object to reflect its existence in the different format. An example of step 270 is configuration engine 130, FIG. 1, updating the transcoding profile 150 to reflect the availability of transcoded copy 20 in the different format. Method 200 then advances to step 280, which delivers the content object in the requested format (in this case, the different format).

In embodiments, a content delivery network (e.g., CDN 100) may include geographically distributed resources, optionally organized into POPs, across which content is distributed, to reduce latency experienced by end users 124 when content is requested. It is contemplated that any of the system resources herein, such as storage, file servers, transcoders, load balancers, configuration engine, sweeper functionality, as well as other hardware or functions such as caching proxies, publishers, local storage and storage databases may be centrally located or may be distributed geographically, e.g., at the "edge" of the network (POPs that are closest to end users, in latency and/or geographically). Similarly, a content delivery network may have knowledge of likely correlations between geographic locations and demand for certain content and/or download formats, and transcoding tasks as described herein may be directed to and carried out in parts of the content delivery network where demand is expected for a given content object or format.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments. It is contemplated that as necessary, functionality of the items identified herein may be provided by specially designed electronic hardware or by software executing on electronic hardware.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the terms "memory" and/or "storage medium" may represent one or more memories for storing data, including read only memory (ROM), static or dynamic random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A method of managing resources dedicated to a content object in a content delivery network, comprising:
   receiving the content object in an original format from a content provider;
   transcoding the content object into one or more delivery formats, the one or more delivery formats being less than a full set of delivery formats into which the content delivery network is capable of transcoding;
   storing the content object, transcoded into the one or more delivery formats, as transcoded copies of the content object;
   creating a transcoding profile associated with the content object, the transcoding profile specifying at least the one or more delivery formats, and including at least an existence record and a last access time record of the transcoded copies;
   receiving a request from an end user for the content object; and
   when the request for the content object is for one of the one or more delivery formats:
   delivering the corresponding transcoded copy of the content object to the one of the end users, and
   updating the last access time record of the transcoded copy in the transcoding profile associated with the content object;
   when the request for the content object is for a different format that is one of the full set of delivery formats, but is not one of the one or more delivery formats:
   transcoding the content object into the different format to form a first additional transcoded copy of the content object;
   storing the content object, transcoded into the different format, as the first additional transcoded copy;
   updating the transcoding profile associated with the content object to include a record of existence and last access time of the first additional transcoded copy; and
   delivering the first additional transcoded copy to the one of the end users.

2. The method of managing resources dedicated to a content object in a content delivery network as recited in claim 1, wherein:
   creating the transcoding profile associated with the content object includes creating a status indicator for the content object.

3. The method of managing resources dedicated to a content object in a content delivery network as recited in claim 1, wherein:

creating the transcoding profile associated with the content object includes placing rules in an object rules field for the transcoded copies.

4. The method of managing resources dedicated to a content object in a content delivery network as recited in claim 3, wherein:

placing the rules in the object rules field for the transcoded copies includes placing executable code in the object rules field.

5. The method of managing resources dedicated to a content object in a content delivery network as recited in claim 1, wherein:

the content delivery network includes a plurality of points of presence (POPs) that are distributed geographically, and creating the transcoding profile associated with the content object includes creating the records with information identifying a POP or a geographic location at which the transcoded copies are stored.

6. The method of managing resources dedicated to a content object in a content delivery network as recited in claim 1, further comprising:

upon receiving the request from the end user for the content object:

transcoding the content object into another one of the full set of delivery formats that is not the different format, to form a second additional transcoded copy of the content object, storing the content object, transcoded into the another one of the full set of delivery formats, as the second transcoded copy, and updating the transcoding profile to include a record of existence and last access time of the second transcoded copy.

7. The method of managing resources dedicated to a content object in a content delivery network as recited in claim 1, further comprising:

periodically executing a process that:

determines, utilizing the transcoding profile, if a transcoded copy of the content object in a particular delivery format meets predetermined criteria for deletion, and deletes the transcoded copy of the content object in the particular delivery format when the copy of the content object meets the criteria for deletion.

8. The method of managing resources dedicated to a content object in a content delivery network as recited in claim 7, wherein:

creating the transcoding profile associated with the content object includes creating a status indicator for the content object, and periodically executing the process includes utilizing the status indicator to determine if the individual transcoded copies of the content object should be reviewed for deletion.

9. The method of managing resources dedicated to a content object in a content delivery network as recited in claim 7, wherein:

periodically executing the process includes applying rules based on the last access time record of the transcoded copy to determine if the transcoded copy meets the predetermined criteria for deletion.

10. The method of managing resources dedicated to a content object in a content delivery network as recited in claim 1, wherein:

creating the transcoding profile associated with the content object includes placing rules in an object rules field for the transcoded copies, and periodically executing the process includes following rules in the object rules field.

11. The method of managing resources dedicated to a content object in a content delivery network as recited in claim 10, wherein:

placing the rules in the object rules field for the transcoded copies includes placing executable code in the object rules field, and periodically executing the process includes executing the code.

12. A content delivery network configured for managing resources dedicated to a content object, comprising:

one or more points of presence (POPs) capable of receiving the content object in an original format from a content provider;

one or more transcoders that transcode the content object into transcoded copies in one or more delivery formats, the one or more delivery formats being less than a full set of delivery formats that the transcoders are capable of transcoding the content object into;

a configuration engine that generates and updates a transcoding profile associated with the content object, the transcoding profile specifying at least the one or more delivery formats, and including at least records of existence and last access time of the transcoded copies; and storage, comprising computer readable media for storing one or more of the content object in the original format, transcoded copies of the content object, transcoding profiles, and software;

wherein, at a first time:

one of the POPs receives the content object from the content provider, one of the transcoders transcodes the content object to form one of the transcoded copies in a first one of the one or more delivery formats, the transcoder stores the one of the transcoded copies in the storage, and the configuration engine generates a transcoding profile associated with the content object;

and at a second time:

the content delivery network receives a request from an end user for the content object; and when the request for the content object is for the first one of the one or more delivery formats:

the configuration engine updates the last access time record of the transcoded copy in the transcoding profile associated with the content object, and the content delivery network delivers the corresponding transcoded copy of the content object to the one of the end users;

when the request for the content object is for a different format that is one of the full set of delivery formats, but is not the first delivery format:

one of the transcoders transcodes the content object into the different format to form a first additional transcoded copy of the content object;

the one of the transcoders stores the content object, transcoded into the different format, in the storage as the first additional transcoded copy;

the configuration engine updates the transcoding profile associated with the content object to include a record of existence and last access time of the first additional transcoded copy; and the content delivery network delivers the first additional transcoded copy to the one of the end users.

13. The content delivery network configured for managing resources dedicated to a content object as recited in claim 12, wherein:
the configuration engine creates a status indicator for the content object when it generates the transcoding profile associated with the content object.

14. The content delivery network configured for managing resources dedicated to a content object as recited in claim 12, wherein:
the configuration engine places rules in an object rules field for the transcoded copies when it generates the transcoding profile associated with the content object.

15. The content delivery network configured for managing resources dedicated to a content object as recited in claim 14, wherein:
the rules placed in the object rules field comprise executable code.

16. The content delivery network configured for managing resources dedicated to a content object as recited in claim 12, wherein:
the one or more points of presence (POPs) are distributed geographically, and
the transcoding profile associated with the content object includes information identifying a POP or a geographic location at which the transcoded copies of the content object are stored.

17. The content delivery network configured for managing resources dedicated to a content object as recited in claim 12, wherein:
at the second time:
one of the transcoders transcodes the content object into another one of the full set of delivery formats that is not the different format, to form a second additional transcoded copy of the content object,
the one of the transcoders stores the content object, transcoded into the another one of the full set of delivery formats, as the second transcoded copy, and
the configuration engine updates the transcoding profile to include a record of existence and last access time of the second transcoded copy.

* * * * *